March 25, 1969     D. W. ROLLINS     3,434,683
SINGLE STRUT TRAILER HITCHES WITH CUSHIONING MEANS
Filed April 17, 1967

DALLAS W. ROLLINS
BY Samuel J. Snyder
ATTORNEY

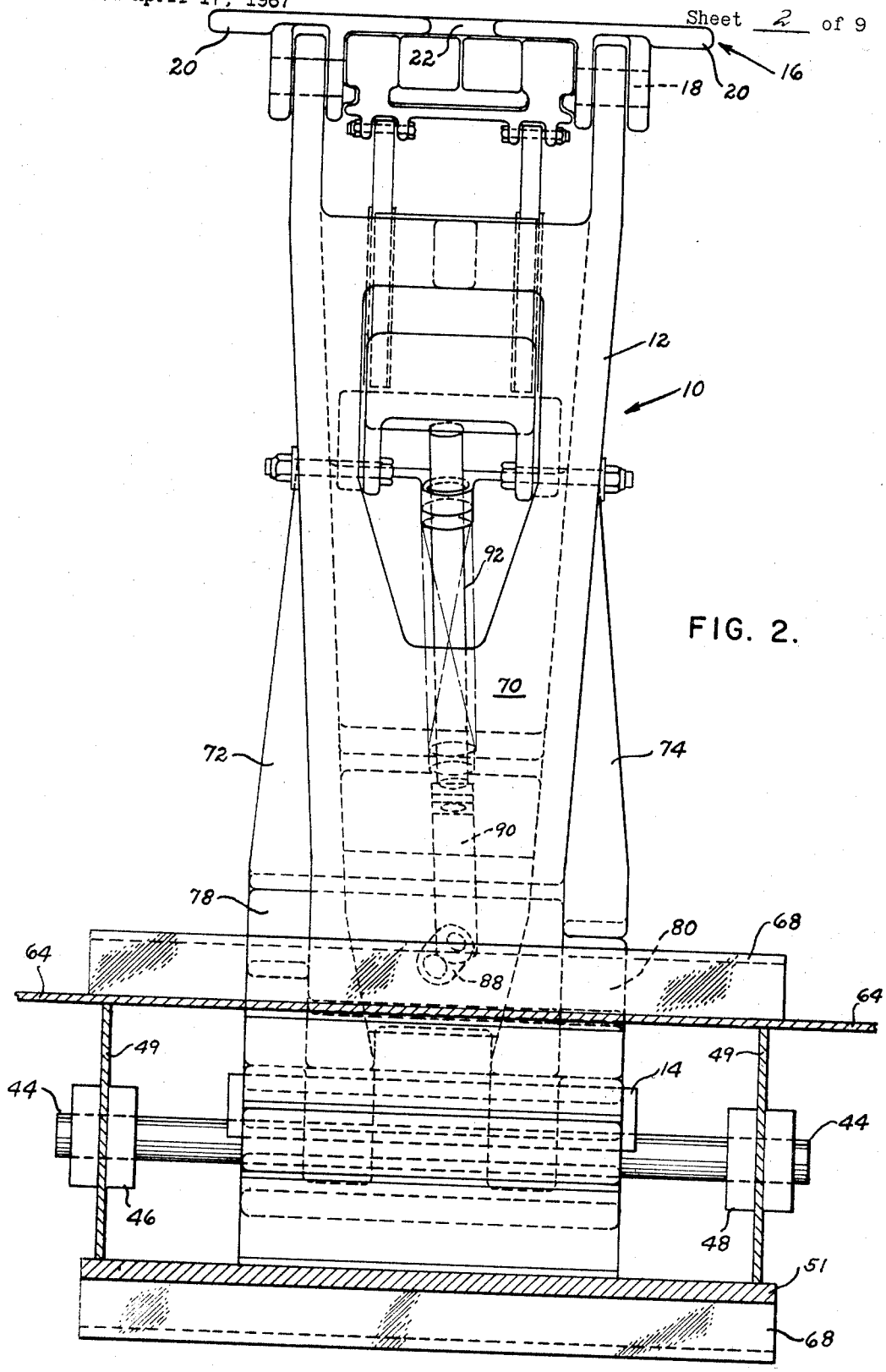

United States Patent Office 3,434,683
Patented Mar. 25, 1969

3,434,683
SINGLE STRUT TRAILER HITCHES WITH CUSHIONING MEANS
Dallas W. Rollins, St. Charles, Mo., assignor to ACF Industries, Incorporated, New York, N.Y., a corporation of New Jersey
Filed Apr. 17, 1967, Ser. No. 631,497
Int. Cl. B60p 7/06; B61d 3/16
U.S. Cl. 248—119           9 Claims

ABSTRACT OF THE DISCLOSURE

A tractor operated collapsible trailer hitch includes a single strut, instead of the usual two struts. The strut is pivotally mounted on a fulcrum which is supported on a railroad car by a lever in one embodiment, and by two pivoted legs or links in another embodiment. When the hitch is erect, locking means lock the lever to the strut in the first embodiment, or lock the pivoted links to the car in the second embodiment, so that the strut can pivot only on one axis. A rubber shock absorber at the lower end of the strut cushions its pivoting movement.

Background of the invention

Hitches for holding trailers on railroad cars are provided with cushioning means and include a fifth wheel plate at the top of a vertical strut supported by an oblique leg connecting a midpoint thereof to the car. Generally, the oblique leg is cushioned to permit adequate cushioned movement of the vertical strut. Commercial hitches of this type are complex, may extend over a considerable length of the car, and sometimes are difficult to collapse so that they lie very close to the car. Tractor operated hitches may be so heavy that they are hard to pull up, especially under poor traction conditions.

A single strut hitch, which avoids some of the drawbacks of the other hitches, is disclosed in application Ser. No. 488,385, filed Sept. 20, 1965, now abandoned. In that application the cushioning means is in the fifth wheel plate, whereas the strut is locked in a fixed condition to the car.

Summary of the invention

The present invention provides a tractor operated hitch having only one pivoted strut and cushioning means for the strut supported by the car at the bottom of the strut to permit adequate cushioned travel of the upper end of the strut, which carries the fifth wheel plate. The strut is mounted to pivot as a lever on an axis intermediate the cushion at one end and the fifth wheel at the other end of the strut. The strut mounting includes one or more pivoted members permitting movement about a second axis between the collapsed and erect position, and locking means for locking the strut to a pivoted member, or latching the pivoted members to the car, to prevent pivoting of the strut about the second axis when the hitch is erect. Thus the hitch is prevented from collapsing, and suports the trailer while cushioning the movements of the trailer during transit.

Brief description of the drawing

The invention is illustrated in the accompanying drawing, of which:

FIG. 2 is a front elevation of the hitch of FIG. 1.

Description of the preferred embodiments

Figure 1:
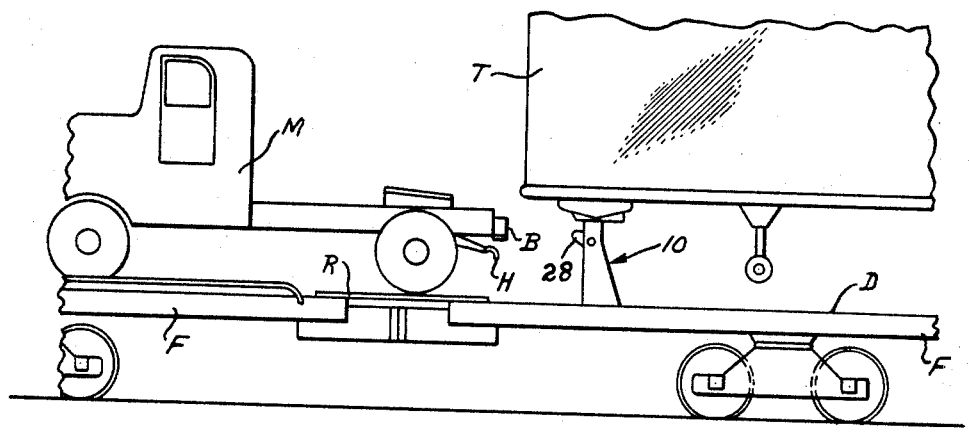
FIG. 1 is a partial side elevation of a hitch supporting the front end of a trailer on a railroad car, and a tractor on two adjacent cars.

Referring to the drawings for a better understanding of the invention and more particularly to FIGURE 1, railway flat cars F are coupled to each other and have deck plates D spanned by bridge plates R. A tractor M is supported on bridge plates R when moving from one flat car to another and is adapted to transport a trailer T partially shown in FIGURE 1. A collapsible trailer hitch or support indicated generally at 10 is mounted adjacent an end of a flat car F and secures a kingpin extending from the front end of trailer T to hold the associated trailer on the flat car.

Referring to FIGURES 2 to 5, hitch 10 comprises a single vertical support or strut 12 having a pivot 14 at its lower end. A fifth wheel plate or structure 16 is connected by horizontal pivot 18 to the top of strut 12. Hitch 10 is adapted to be pulled from a collapsed position to an erect position upon forward movement of tractor M by a hook H on the rear of the tractor M engaging boss 17. A bumper block B attached to the rear of tractor M is adapted to knock hitch 10 to a collapsed position from erect position upon rearward movement of the tractor and thereby effect unlocking of trailer kingpin and unlocking of vertical support 12 permitting collapsing of the hitch as will be explained more fully.

Fifth wheel structure 16 is essentially the same as that shown in Patent 3,262,402 and Patent No. 3,279,731, and since the invention does not reside in that structure per se, it will not be described in detail. Structure 16 includes an upper plate 20 on which the trailer T is adapted to rest, and plate 20 has a forwardly facing slot 22 for receiving the kingpin of the trailer. As clearly disclosed in the above-mentioned patents, mechanism is provided for locking the kingpin of the trailer to the fifth wheel structure 16 during transit, and for unlocking the kingpin when it is desired to remove the hitch from the trailer. The unlocking mechanism includes lever 24 mounted on pivot 26, and adapted to be pushed backward when tractor bumper block B strikes lever 28.

Figure 5:
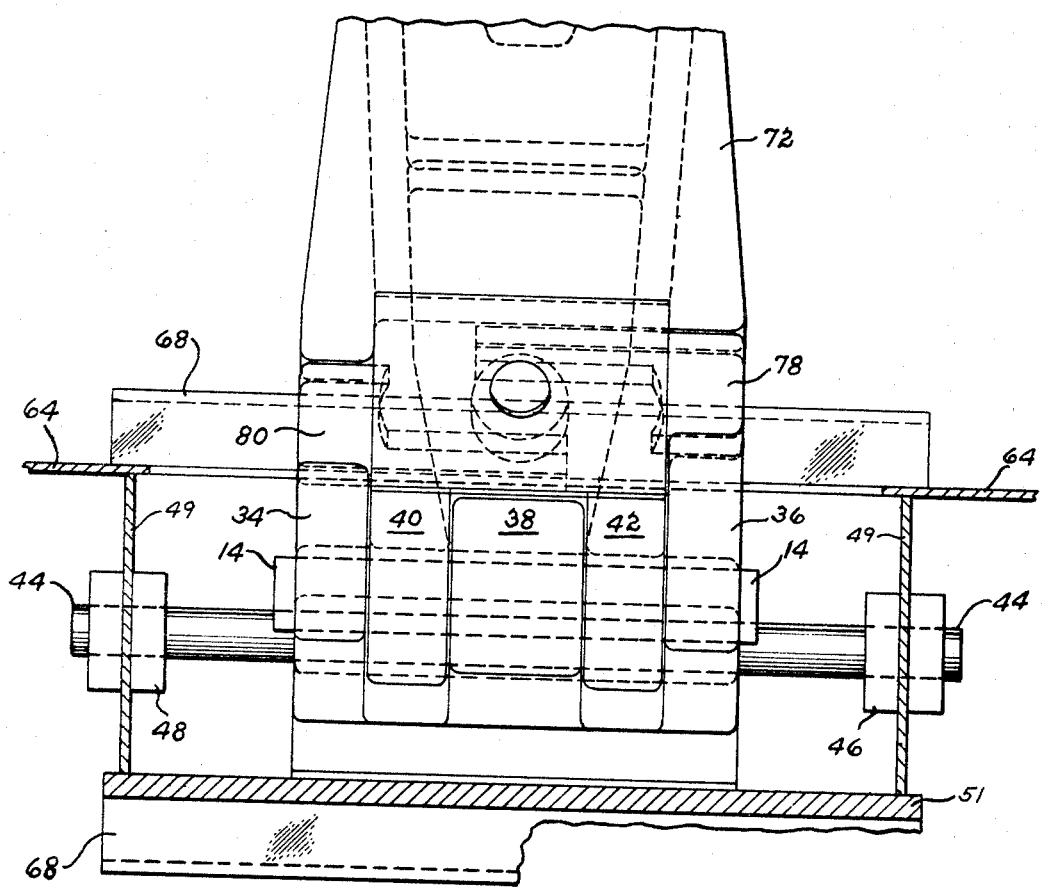
FIG. 5 is a partial rear elevation showing the lower part of the hitch.
Figure 3:
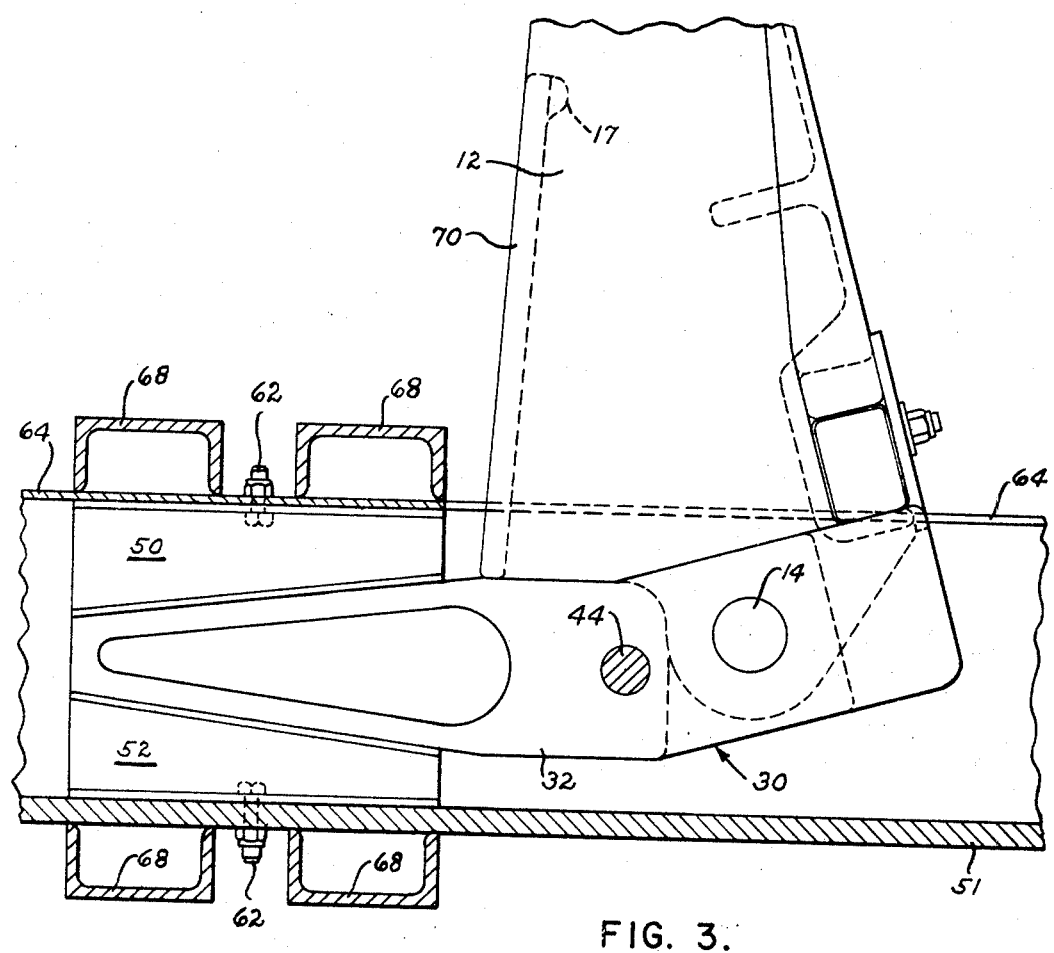
FIG. 3 is a partial sectional view of the lower portion of the hitch.
Figure 4:
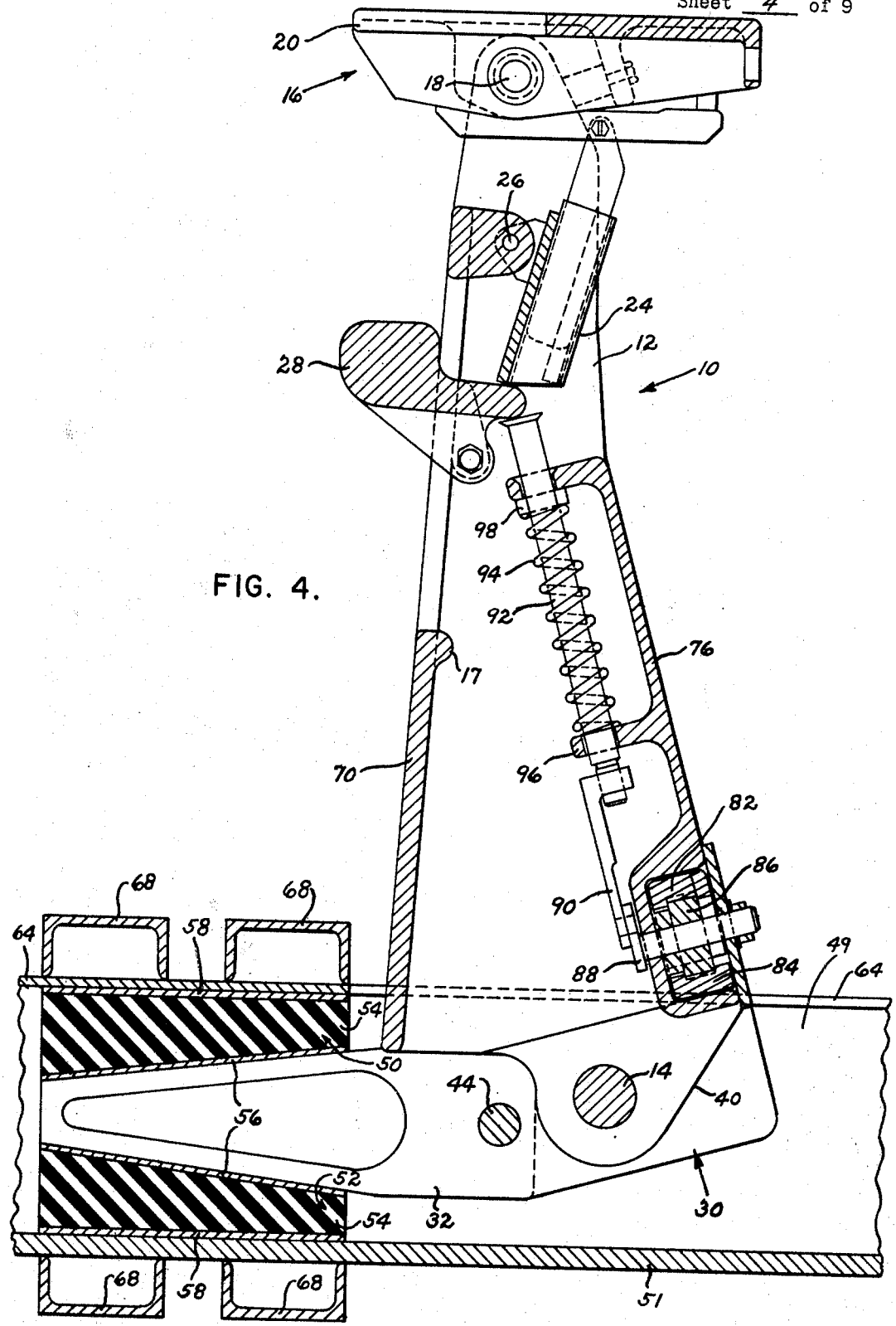
FIG. 4 is a side sectional view of the hitch.

Strut 12 is mounted on lever 30 having a front arm 32 and a rear portion consisting of ears 34, 36 and a middle projection 38 as shown in FIGURE 5. Strut 12 terminates in a pair of projections 40 and 42 extending between ears 34, 36 and projection 38, and the shaft forming pivot 14 is journalled in elements 34–42. Lever 30 pivots on shaft 44, which is mounted in bearings 46, 48 fixed to vertical plates 49 extending upwardly from a lower support plate 51 of the underframe structure. Arm 32 of lever 30 extends between and engages upper and lower portions 50, 52 of a shock absorber or cushioning device. These portions of the cushioning device consist of rubber pads 54, or the like, between suitable metallic face plates 56, 58. The cushion device may be fastened to the car by any suitable means, such as bolts 62 extending through plates 58 and lower support plate 51. Deck plate 64 and lower support plate 51 are strengthened by welding channels 68 thereto crosswise. Thus, strut 12 is inset below the deck of car F.

Figure 6:
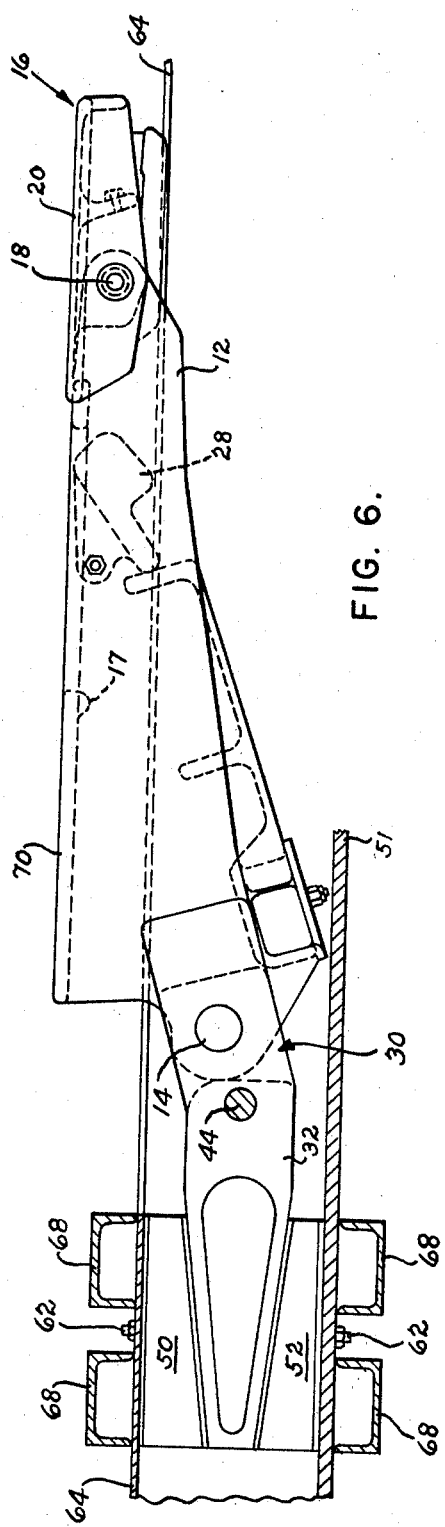
FIG. 6 is a side elevation, partly in section showing the hitch in collapsed position.
Figure 7:
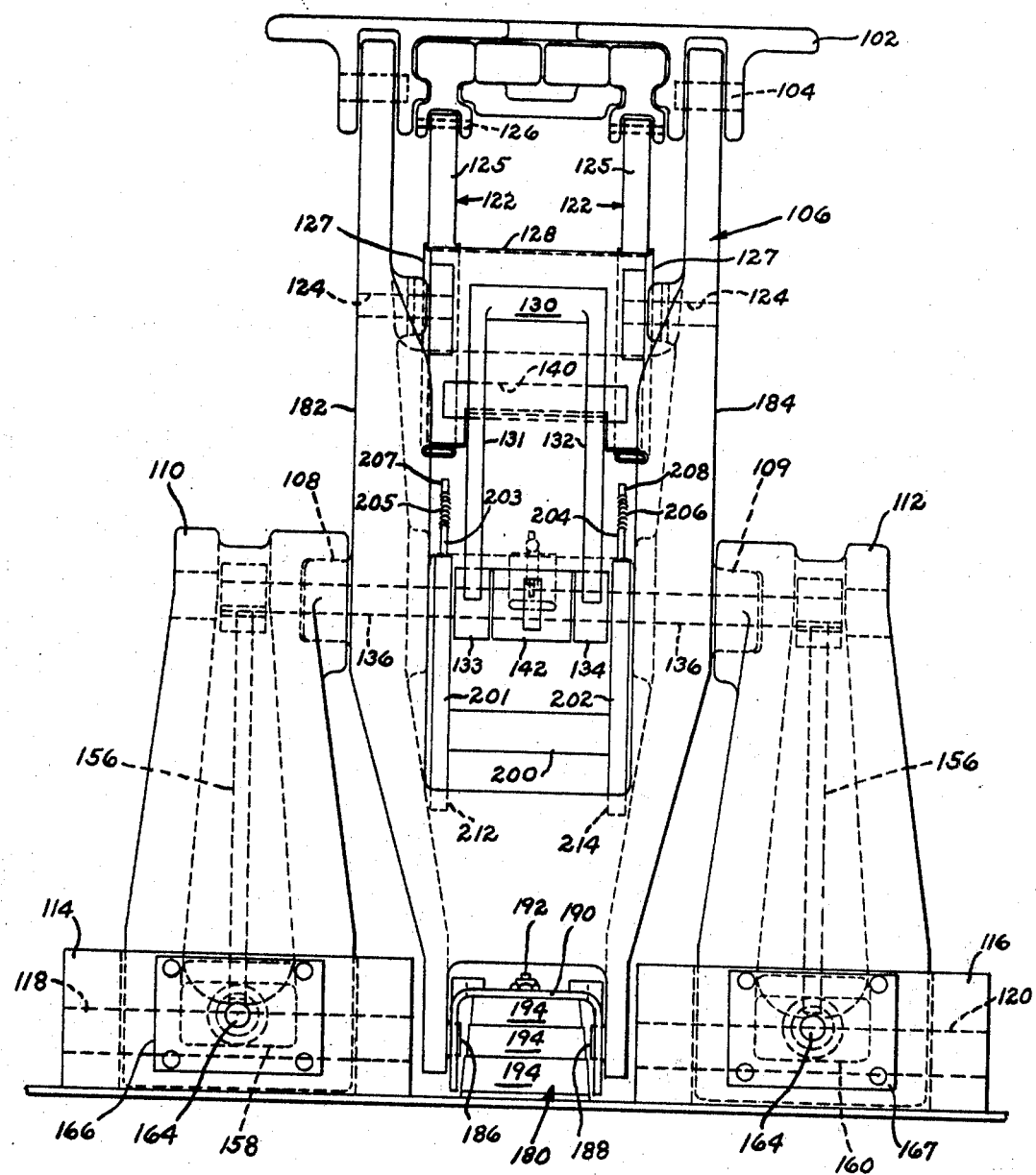
FIG. 7 is a front elevation of another embodiment of the invention.

The front wall 70 of strut 12 rests on lever arm 32, and projections 72, 74 of rear wall 76 of the strut rest on movable blocks 78, 80, which in turn engage ears 34 and 36 of lever 30. Blocks 78, 80 are integral with gear racks 82, 84 which extend inwardly and engage opposite sides of a pinion gear 86. This structure is essentially like that shown in Patent 3,279,731, FIGURES 5 and 6 and Patent 3,262,402, FIGURES 2 and 6. The pinion gear 86 is turned by a crank 88 connected to a link 90 fastened to the end of rod 92. Spring 94 acts between flange 96 and collar 98 secured to rod 92 to move the latter upwardly, and thereby turn pinion 86 so as to move racks 82, 84 and blocks 78, 80 outwardly, into their locking position to prevent strut 12 from being movable relative to lever 30.

The operation of the hitch shown in FIGURES 1 to 6 will now be described. For collapsing the hitch and removing the trailer, tractor M moves rearwardly until bumper B strikes lever 28, turning the latter about its pivot. The rear portion of lever 28 presses rod 92 downward, against the action of spring 94. Thus link 90 moves downward, turns crank 88, and through spur gear 86, and gear racks 82 and 84 causes bearing blocks 78, 80 to retract. During the rearward motion of lever 28, lever 24 is struck and rotated about pivot 26 to unlock the jaws engaging the trailer kingpin. Vertical strut 12 then pivots rearwardly into its collapsed position, shown in FIGURE 6, under the impact of the tractor.

In loading trailer T on the car, the trailer is positioned by tractor M. Hook H is then lowered to engage boss 17, and the tractor, after unlocking the kingpin, moves forwardly to raise the hitch. When strut 12 reaches its upright position, spring 94 acts against collar 98 to move rod 92 upwardly, and this results in an outward movement of bearing blocks 78, 80 into locking position. Hook H is then removed from boss 17 and tractor M then pushes trailer T backward until the kingpin is locked into fifth wheel plate 16.

The second embodiment of the invention is shown in FIGS. 7–11. The fifth wheel plate 102 may be the same as that of the first embodiment, and is pivotally connected at 104 to a lever strut 106 fulcrumed on lugs 108 and 109 in legs 110, 112, which are pivoted to base supports 114, 116 by shafts 118, 120. A lever 122 pivoted at 124 is provided to unlock the kingpin engaging jaws (not shown) in the fifth wheel plate. Levers 122 include arms 125 pivotally connected at 126 and slidable in sleeves 127 pivoted at 124 and fastened to plate 128. Bumper bar 130 is adapted to be engaged by the bumper B of the tractor to unlock the kingpin and unlatch strut 106 as will be described more fully later. Bumper bar 130 has a pair of side arms 131, 132 terminating in bearings 133, 134 on shaft 136, and a web 138 extending between side arms 131, 132. Rod 140 is fixed to bumper bar 130 and is adapted to engage lever 122 when pushed back by the tractor bumper B.

Figure 10:
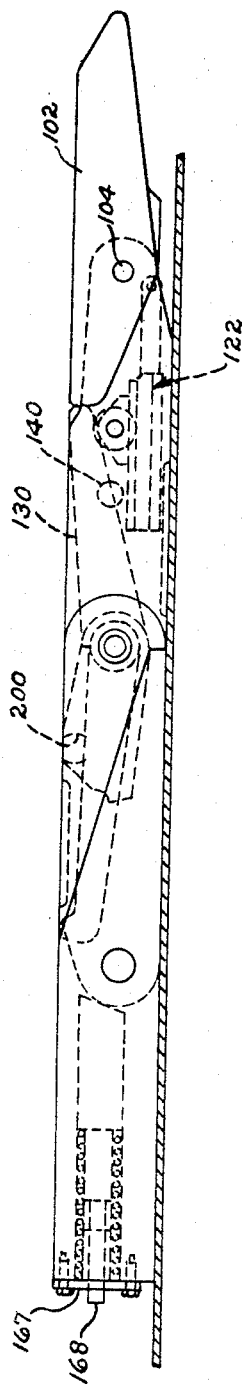
FIG. 10 is a side elevation showing the hitch of FIGS. 7–9 in the collapsed position.
Figure 11:
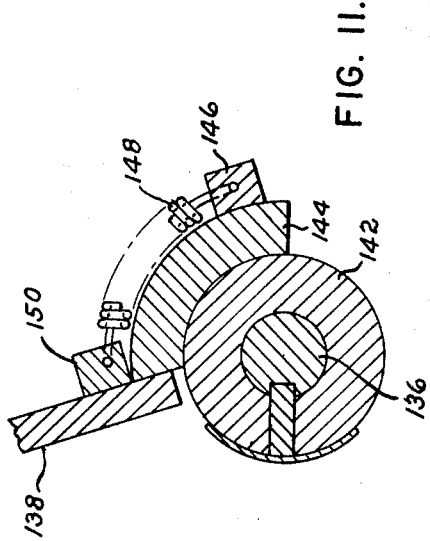
FIG. 11 is a detail sectional view of a portion of the lock actuating mechanism.

Shaft 136 has a bushing 142 keyed thereto, with a sector 144 fixed to the bushing (FIG. 11). Lug 146 on sector 144 is connected by tensioned spring 148 to lug 150 on web 138, to hold web 138 against sector 144 and to permit bumper bar 130 to drop, as shown in FIGURE 10, when the hitch is in the collapsed position. Thus a rearward movement of bumper bar 130, initiated by the tractor, causes rod 140 to turn lever 122 to unlock the kingpin of the trailer, and also causes a rotation of shaft 136. At each end of shaft 136 a collar 152 is fastened by a key 154, and a release bar 156 integral with collar 152 extends down through a central portion of legs 110 and 112, which form a trunion for strut 106. As previously mentioned, legs 110 and 112 are journalled on shafts 118 and 120 in base supports 114 and 116, and are normally locked in their upright positions by locking bars 158, 160 extending into slots in the lower ends of legs 110 and 112. Bars 158 and 160 are urged to their locking inward positions by springs 161, 162 surrounding rods having portions 163, 164. In their unlocked positions rods 164 extend outwardly of cover plates 166, 167, as shown at 168, to indicate that the hitch is unlocked.

When a tractor strikes bumper bar 130 to turn arms 131, 132 and web 138 on shaft 136, web 138 turns shaft 136, through sector 144 and bushing 142. The rotation of shaft 136 turns bars 156, the toes 170 of which push locking bars 158, 160 to their unlocking position. Legs 110 and 112 can then turn rearwardly on shafts 118 and 120, carrying the entire hitch to its collapsed position shown in FIG. 10.

Figure 8:
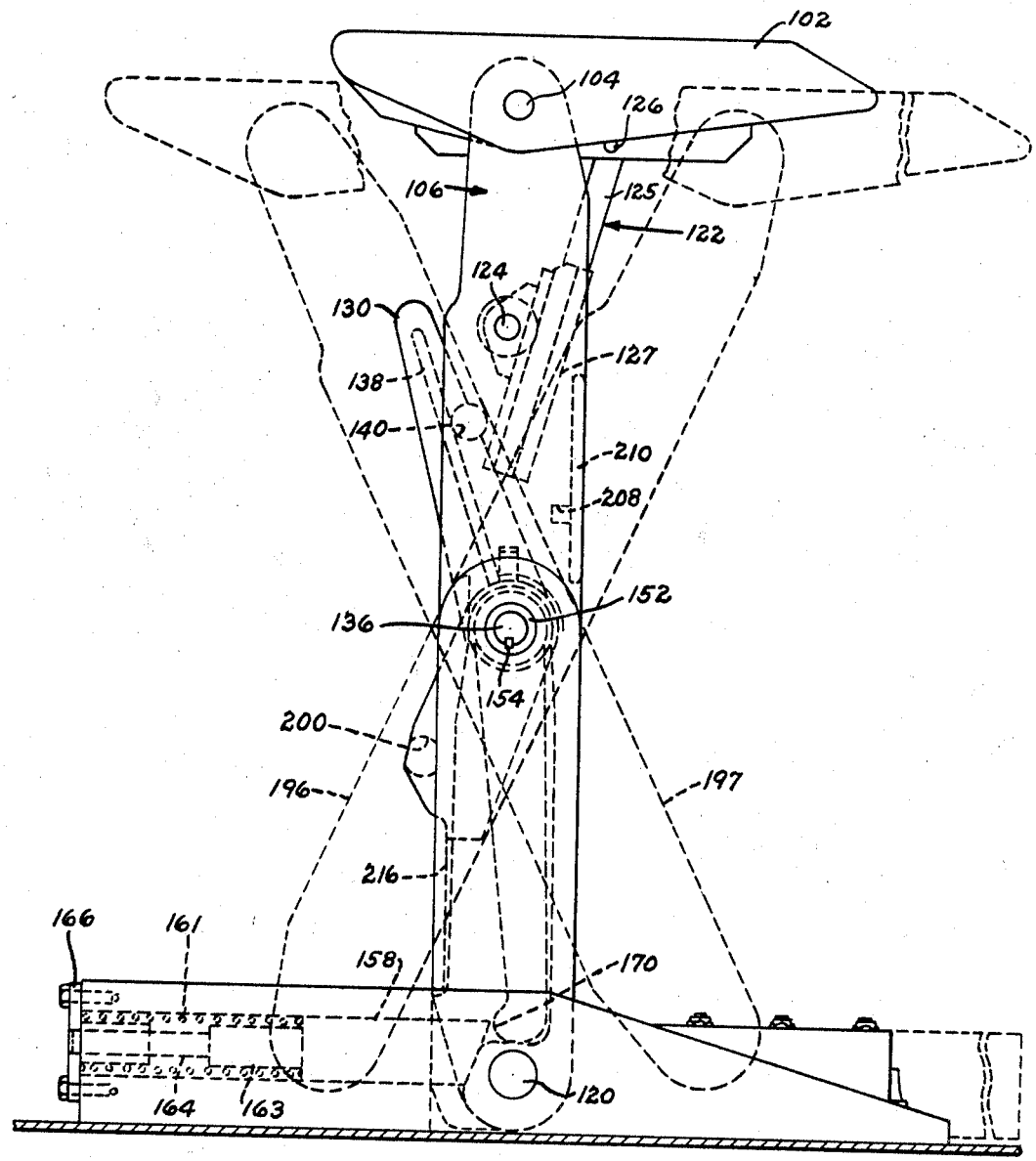
FIG. 8 is a side elevation of the hitch of FIG. 7, showing different operative positions in dashed lines.
Figure 9:
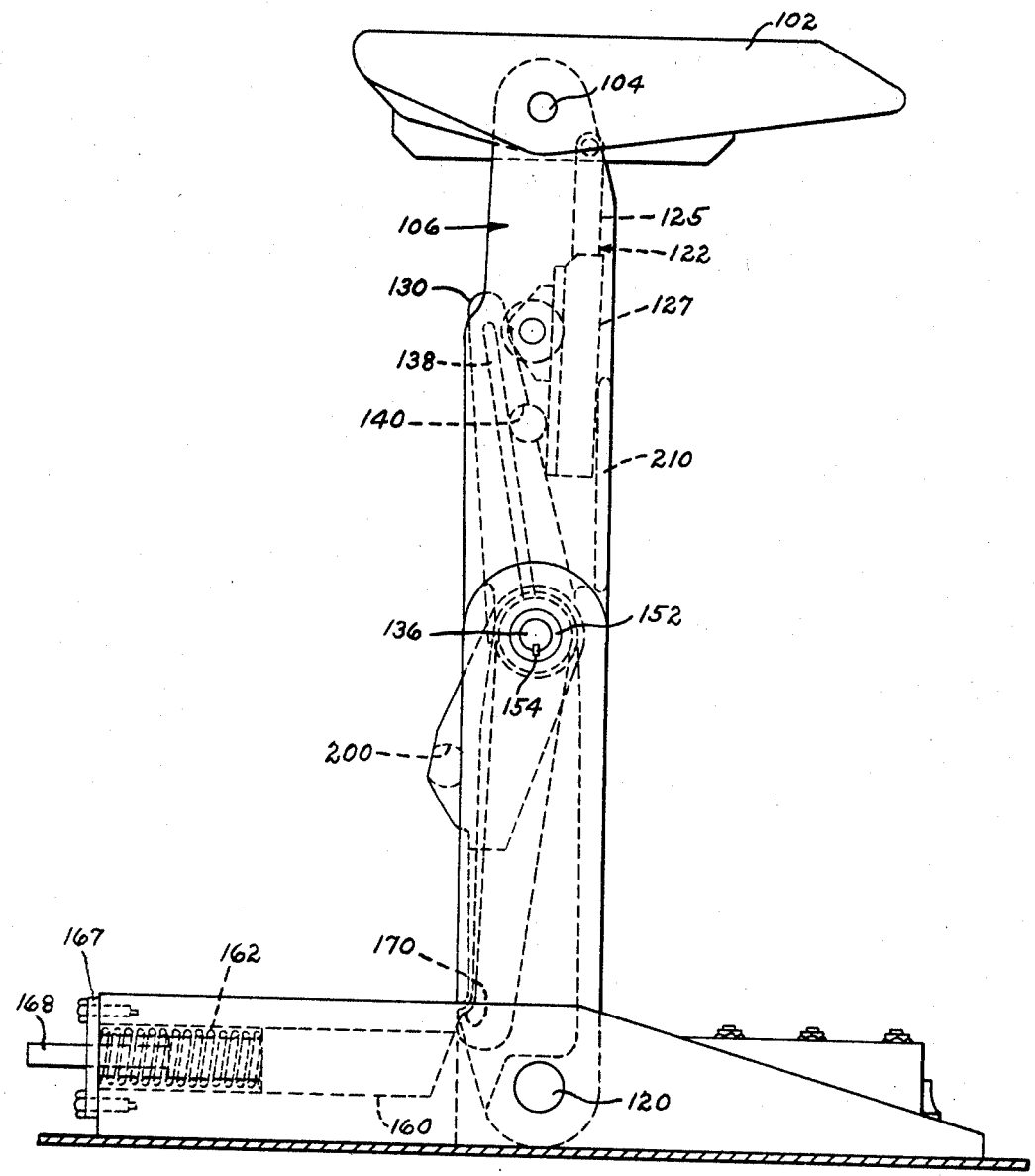
FIG. 9 is a side elevation showing the locking means actuated to the unlocked position.

The bottom end of pivoted strut 106 is connected to a rubber shock absorber 180 which has its lower surface secured to the deck. Strut 106 has two side members 182, 184 extending from pivots 104 on fifth wheel plate 102 down to shock absorber 180. Members 182, 184 have pins 186, 188 extending into a saddle 190, which is fastened to the upper surface of shock absorber 180 by bolts 192. Pins 186 and 188 are coaxial with shafts 118 and 120, so that the entire hitch may pivot about their common axis. The shock absorber 180 may consist of a plurality of rubber pads 194 bonded to upper, lower, and intervening metallic plates (not shown) in a manner which is well-known. Thus the shock absorber is adapted to move longitudinally in shear to permit cushioned pivotal movement of strut 106 and fifth wheel plate 102. This is indicated in FIG. 8, where the extreme positions of strut 106 are shown by dashed lines 196 and 197. The shock absorber 180 may be designed to permit about eight inches of forward and rearward movement of the lower end of strut 106, and a resulting equal movement of the upper end of strut 106 and fifth wheel plate 102.

To raise the hitch the hook H of the tractor is lowered to engage pull-up bar 200 fixed to arms 201 and 202. The latter are pivoted on shaft 136. The upper ends of arms 201, 202 have lugs 203, 204 connected by springs 205, 206 to lugs 207, 208 on a plate 210 of strut 106. Thus arms 201 and 202 are urged in a clockwise direction by springs 205, 206, so that the notched lower ends 212, 214 of arms 201, 202 engage plate 216 of strut 106. When the hitch is in its collapsed position pull-on bar 200 and arms 201, 202 may drop, by turning counterclockwise, against the tension of spring 205, 206, and thereby lower the overall height of the collapsed hitch.

I claim:

1. In a collapsible trailer hitch for a railroad car adapted to be erected and collapsed by a tractor comprising, a support, a single strut mounted on the support for pivotal movement about a first axis between a generally horizontal collapsed position and a generally vertical erect position, means carried by the upper end of the strut to engage the kingpin of a trailer or the like, locking means mounted adjacent the lower end of the strut in the erect position thereof to releasably lock the strut in erect position against pivotal movement about said first axis, and actuating means on the strut operatively connected to said locking means, said actuating means operable to unlock the strut for collapsing of the hitch: the improvement comprising cushioning means mounted on said support, means for connecting the lower end of said strut to said cushioning means and for enabling limited cushioned pivotal movement of said strut about a second axis when said strut is locked in its erect position.

2. The apparatus of claim 1 wherein said means for connecting said cushioning means to the lower end of said strut is a lever fulcrumed on said second axis and having one arm engaging the cushioning means and the other arm engaging the lower end of said strut through said locking means.

3. The apparatus of claim 2, wherein said other arm of said lever has a pivotal connection at said first axis to the lower end of said strut, whereby said strut pivots about said pivotal connection to its collapsed position when the strut is unlocked from said lever.

4. The apparatus of claim 1, wherein said strut has a fulcrum on said second axis at an intermediate point of the strut, a pair of arms depending from said fulcrum on opposite sides thereof, said arms being connected to said support, said locking means locking at least one of said arms against movement relative to said support.

5. The apparatus of claim 4, wherein said arms are pivotally connected to said support, said locking means being arranged to lock said arms against pivoting on said support.

6. The apparatus of claim 5, wherein said cushioning means includes a rubber cushion connecting the lower end of the strut to the car.

7. The apparatus of claim 3, wherein said locking means in the locked position rigidly connects the strut to the lever.

8. The apparatus of claim 2, wherein said cushioning means includes two compressible elements engaging opposite sides of said lever so that movement of the lever compresses one or the other of said elements.

9. The apparatus of claim 1, wherein said strut has a fulcrum at an intermediate point thereof, said fulcrum being on said second axis, means for supporting said fulcrum, said locking means being connected to said fulcrum supporting means for holding said fulcrum in a fixed position.

References Cited

UNITED STATES PATENTS

| | | | |
|---|---|---|---|
| 2,093,761 | 9/1937 | Kramer | 105—368 |
| 2,880,681 | 4/1959 | Markestein et al. | 248—119 |
| 3,035,801 | 5/1962 | Mangels | 248—119 |
| 3,246,866 | 4/1966 | Price et al. | 248—119 |
| 3,262,402 | 7/1966 | Mowatt-Larssen et al. | 105—368 |
| 3,279,731 | 10/1966 | Rollins | 105—368 |
| 3,353,505 | 11/1967 | Rollins et al. | 248—119 |

FRANCIS K. ZUGEL, *Primary Examiner.*

U.S. Cl. X.R.

105—368